United States Patent
Lin et al.

(10) Patent No.: US 8,885,528 B2
(45) Date of Patent: Nov. 11, 2014

(54) WIRELESS APPARATUS, BASE STATION AND UPLINK CONTENTION METHOD THEREOF USING MAPPING RULE ON UPLINK SIGNAL WITH PREAMBLE SEQUENCE AND CONTROL MESSAGE

(75) Inventors: Yi-Ting Lin, New Taipei (TW);
Tsung-Yu Tsai, Tainan County (TW);
Chun-Che Chien, Taipei (TW);
Kanchei Loa, Taipei (TW)

(73) Assignee: Institute For Information Industry, Taipei (TW)

( * ) Notice: Subject to any disclaimer, the term of this patent is extended or adjusted under 35 U.S.C. 154(b) by 527 days.

(21) Appl. No.: 13/161,270

(22) Filed: Jun. 15, 2011

(65) Prior Publication Data

US 2011/0310828 A1    Dec. 22, 2011

Related U.S. Application Data

(60) Provisional application No. 61/356,054, filed on Jun. 18, 2010.

(51) Int. Cl.
| | | |
|---|---|---|
| *H04B 7/00* | (2006.01) | |
| *H04W 28/06* | (2009.01) | |
| *H04W 74/08* | (2009.01) | |
| *H04W 72/12* | (2009.01) | |
| *H04W 76/02* | (2009.01) | |
| *H04W 72/04* | (2009.01) | |

(52) U.S. Cl.
CPC .......... *H04W 74/08* (2013.01); *H04W 72/1284* (2013.01); *H04W 28/06* (2013.01); *H04W 76/02* (2013.01); *H04W 72/044* (2013.01)
USPC ............................. 370/310; 370/329; 370/431

(58) Field of Classification Search
None
See application file for complete search history.

(56) References Cited

U.S. PATENT DOCUMENTS

| | | | |
|---|---|---|---|
| 2007/0230600 A1 | 10/2007 | Bertrand et al. | |
| 2009/0046629 A1 * | 2/2009 | Jiang et al. | 370/328 |
| 2009/0086832 A1 * | 4/2009 | Tarokh et al. | 375/260 |
| 2009/0186613 A1 * | 7/2009 | Ahn et al. | 455/434 |
| 2010/0260079 A1 * | 10/2010 | Baldemair et al. | 370/280 |

OTHER PUBLICATIONS

Extended European Search Report to the corresponding European Patent Application No. 11170136.3-1857 rendered by the European Patent Office on May 13, 2014, 13 pages.
NTT DOCOMO, et al., Time resource for dedicated RA preambles, Aug. 12, 2008, 7 pages.
Motorola, et al., E-UTRA Random Access Channel TP, Mar. 27, 2006, 6 pages.

* cited by examiner

*Primary Examiner* — Ayaz Sheikh
*Assistant Examiner* — Peter Chau
(74) *Attorney, Agent, or Firm* — Skaar Ulbrich Macari, P.A.

(57) ABSTRACT

A wireless apparatus, a base station and uplink contention methods thereof are provided. The wireless apparatus selects a preamble sequence and at least one resource block on an uplink shared channel (UL-SCH) according to a mapping rule. The wireless apparatus transmits an uplink signal with a preamble sequence on a random access channel (RACH) and a control message on the at least one resource on the UL-SCH to a base station. The base station detects the preamble sequence from the RACH, and retrieves the control message from the at least one resource block on the UL-SCH according to the mapping rule.

14 Claims, 10 Drawing Sheets

WIRELESS APPARATUS, BASE STATION AND UPLINK CONTENTION METHOD THEREOF USING MAPPING RULE ON UPLINK SIGNAL WITH PREAMBLE SEQUENCE AND CONTROL MESSAGE

PRIORITY

This application claims the benefit of priority based on U.S. Provisional Application Ser. No. 61/356,054, filed on Jun. 18, 2010, which is hereby incorporated by reference herein in its entirety.

FIELD

The present invention relates to a wireless apparatus, a base station and uplink contention methods thereof. More particularly, the wireless apparatus of the present invention transmits an uplink signal with a preamble sequence on a random access channel (RACH) and a control message on at least one resource block on an uplink shared channel (UL-SCH) according a mapping rule, thereby the base station can detect the preamble and retrieve the control message according to the mapping rule within one uplink signal to reduce the delay time when the wireless apparatus transmits two uplink signals respectively with the preamble sequence and the control message at different times.

BACKGROUND

Nowadays, wireless network technologies have been utilized widely. In order to provide different qualities of service (QoS) in different environments, various wireless network system standards have been proposed. Among these wireless network system standards, WiMAX (Worldwide Interoperability for Microwave Access) standard and LTE (Long Term Evolution) standard have become popular wireless network system standards. In existing wireless network systems, when a wireless apparatus wants to establish a network connection or request resources for uplink transmission, the wireless apparatus would perform an uplink random access procedure with a base station in the wireless network system.

As shown in FIG. 1, conventional uplink random access procedures for a wireless network system usually comprise the following steps:

(1) the wireless apparatus 11 transmits a first uplink signal 102 with a preamble sequence on a random access channel (RACH) to the base station 13;

(2) the base station 13 receives the first uplink signal 102 and transmits a first downlink signal 104 with a random access response message to the wireless apparatus 11;

(3) the wireless apparatus 11 receives the first downlink signal 104 and transmits a second uplink signal 106 with a control message on an uplink shared channel (UL-SCH) to the base station 13; and (4) the base station 13 receives the second uplink signal 106 and transmits a second downlink signal 108 with a contention resolution message.

The above steps (i) and (ii) are used to adjust the transmission between the wireless apparatus and the base station. More specifically, the first uplink signal 102 is a reference signal for the base station 13 to generate some adjustment information, such as information for transmission power, frequency offset, timing alignment, etc. The first downlink signal 104 is an adjustment signal with the adjustment information for the wireless apparatus 11 to adjust its transmission parameters. In addition, the first downlink signal 104 also includes the allocation information for the wireless apparatus 11 to carry the control message on at least one resource block on the UL-SCH.

The control message carried by the second uplink signal 106 includes the identity (ID) of the wireless apparatus 11 and the information for requesting resources. The contention resolution message carried by the second downlink signal 108 is an acknowledgement that base station 13 has received the ID and accepted the requested resources. As the random access procedure has finished, the wireless apparatus 11 will transmit uplink data to the base station 13 through the requested resources.

In some cases, the wireless apparatus 11 may stay in the same or similar environment for a period of time. During the period of time, if the wireless apparatus 11 wants to request more resources, the wireless apparatus should perform the uplink random access procedure with the base station 13 again. However, the adjustment information carried by the first downlink signal 104 in the present uplink random access procedure maybe the same or almost same to the adjustment information carried by the first downlink signal 104 in the previous uplink random access procedure. Therefore, in these cases, the step (ii) would be a redundant step.

Accordingly, efforts still have to be made in this field to provide an appropriate uplink random access procedure for the aforementioned cases to improve the efficiency of the wireless network system.

SUMMARY

An objective of certain embodiments of the present invention is to provide an appropriate uplink random access procedure for the aforementioned cases to improve the efficiency of the wireless network system. The uplink random access procedure of the present invention omits the step of transmitting a downlink signal with a random access response message from the base station to the wireless apparatus. Instead, the uplink random access procedure of the present invention transmits an uplink signal with a preamble sequence on a random access channel (RACH) and a control message on an uplink shared channel (UL-SCH) according to a mapping rule. After receiving the uplink signal, the base station detects the preamble sequence and retrieves the control message from the uplink signal according to the mapping rule.

To achieve the aforesaid objective, certain embodiments of the present invention disclose a wireless apparatus comprising a storage module, a processor and a transceiver. The storage module is configured to store a preamble sequence set and a mapping rule. The processor is configured to select a preamble sequence from the preamble sequence set and at least one resource block on a UL-SCH according to the mapping rule. The transceiver is configured to transmit an uplink signal with the preamble sequence on an RACH and a control message on the at least one resource on the UL-SCH to a base station. The mapping rule maps the preamble sequence to the at least one system block on the UL-SCH.

The present invention in further embodiments discloses an uplink contention method for the aforesaid wireless apparatus. The uplink contention method can implemented by a computer program product comprising a non-transitory computer readable medium storing a program for the uplink contention method. When the program is loaded into the wireless apparatus, the uplink contention method can be executed and accomplished by the processor. The uplink method comprises the following steps:

(1) selecting a preamble sequence from a preamble sequence set and at least one resource block on a UL-SCH according to the mapping rule; and (2) enabling a transceiver to transmit an uplink signal with the preamble sequence on an RACH and a control message on the at least one resource block on the UL-SCH to a base station, wherein the mapping rule maps the preamble sequence to the at least one resource block on the UL-SCH.

In addition, to achieve the aforesaid objective, the present invention in further embodiments discloses a base station comprising a storage module, a transceiver and a processor. The storage module is configured to store a preamble sequence set and a mapping rule. The transceiver is configured to receive an uplink signal with an RACH and a UL-SCH. The processor is configured to detect a first preamble sequence from the RACH and retrieves a first control message from the at least one first resource block on the UL-SCH according to the mapping rule. The first preamble sequence is included in the preamble sequence set. The mapping rule maps the first preamble sequence to the at least one first resource block on the UL-SCH. The uplink signal includes a first uplink signal transmitted from a first wireless apparatus, and the first preamble sequence and the at least one first resource block relate to the first wireless apparatus.

The present invention in further embodiments also discloses an uplink contention method for the aforesaid base station. The uplink contention method can implemented by a computer program product comprising a non-transitory computer readable medium storing a program for the uplink contention method. When the program is loaded into the base station, the uplink contention method can be executed and accomplished by the processor. The uplink method comprises the following steps:

(1) enabling a transceiver to receiving an uplink signal with an RACH and a UL-SCH;

(2) detecting a first preamble sequence from the RACH; and (3) retrieving a first control message from the at least one first resource block on the UL-SCH according to a mapping rule, wherein the first preamble sequence is included in a preamble sequence set, the mapping rule maps the first preamble sequence to the at least one first resource block on the UL-SCH, the uplink signal includes a first uplink signal transmitted from a first wireless apparatus, and the first preamble sequence, and the first preamble sequence and the at least one first resource block relate to a first wireless apparatus.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the invention will be explained with reference to example embodiments thereof. However, the description of these example embodiments is only for purposes of illustration rather than limitation. These example embodiments are not intended to limit the present invention to any specific example, embodiment, environment, applications or particular implementations described in these example embodiments. It should be appreciated that in the following embodiments and the attached drawings, the elements not related directly to this invention are omitted from depiction and dimensional relationships among individual elements in the attached drawings are illustrated only for ease of understanding, and not limitation.

Figure 2:
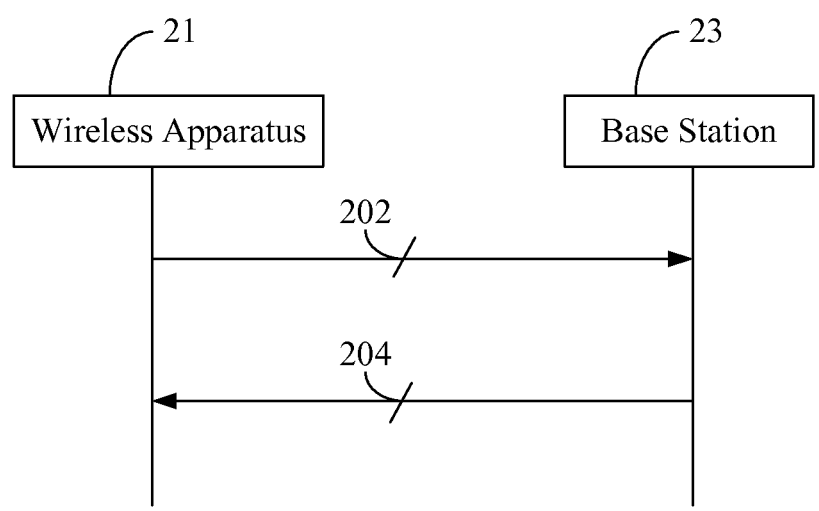
FIG. 2 is a schematic view illustrating the uplink random access procedure for a wireless network system of the present invention.

The first embodiment of this invention is depicted in FIG. 2, which is a schematic view illustrating the uplink random access procedure for a wireless network system of the present invention. The wireless network system comprises a wireless apparatus 21 and a base station 23. The uplink random access procedure is performed when wireless apparatus 21 has established connection with the base station 23 and wants to re-request resources for uplink transmission.

The wireless network system of the present invention may be the Long-Term Evolution (LTE) system or LTE-like system. The wireless apparatus 21 is a user equipment which conforms to the LTE standard, e.g. a cell phone, a PDA, a mobile computer, or some other wireless device that needs to establish connection with the base station 23. In this case, the base station 23 would be the eNodeB which conforms to the LTE standard. However, it shall be noted that the technical means of the present invention are not only applied for the LTE system, but also for any wireless network system which needs to perform an uplink random access procedure.

First of all, the wireless apparatus 21 transmits the uplink signal 202 with a random access channel (RACH) and an uplink shared channel (UL-SCH) to a base station 23. For the LTE system, the UL-SCH is a physical uplink shared channel and the RACH is a physical random access channel. The uplink signal 202 has a preamble sequence on the RACH and a control message on at least one resource block (RB) on the UL-SCH. The preamble sequence is associated with the at least one resource block based on a mapping rule.

After receiving the uplink signal 202, the base station 23 detects the preamble sequence on the RACH and retrieves the control message from the at least one resource block on the UL-SCH according to the mapping rule. Besides, the wireless apparatus 21 can also use uplink signal 202 to carry data on the at least one resource block on the UL-SCH, and the base station 23 can retrieve the data from the at least one resource on the UL-SCH according to the mapping rule.

Figure 1:
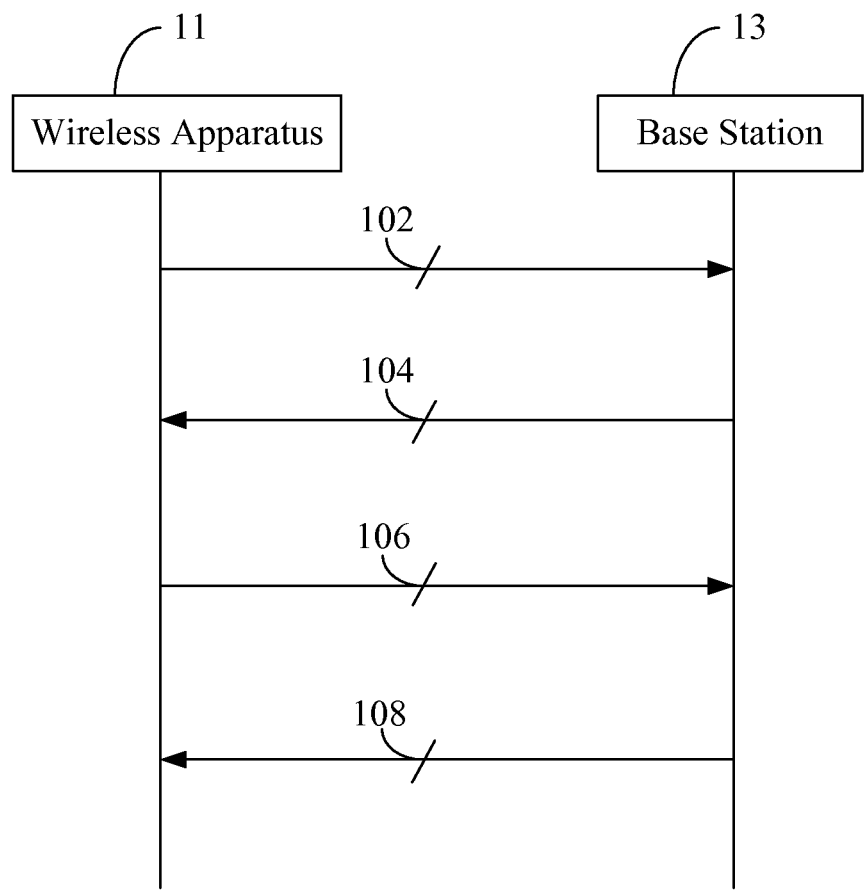
FIG. 1 is a schematic view illustrating the uplink random access procedure for a conventional wireless network system.

Since the control message includes the identity (ID) of the wireless apparatus 21 and the information for requesting resources, the base station 23 would store the ID of the wireless apparatus 21 and assigns the uplink resources for the wireless apparatus 21 according to the control message. Afterwards, the base station 23 transmits a downlink signal 204 with a contention resolution message in acknowledgement of retrieving the control message to the wireless apparatus 21. It is conceived that in comparing to the conventional uplink random access procedure as shown in FIG. 1, the present invention only needs two steps to finish the uplink random access procedure.

Figure 3:
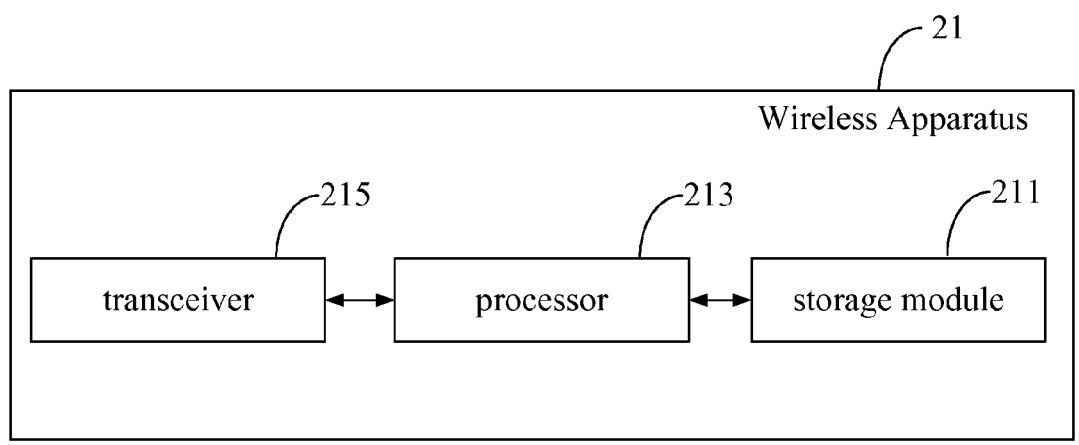
FIG. 3 is a schematic view of a wireless apparatus of the present invention.

In detail, referring to FIG. 3, the wireless apparatus 11 comprises a storage module 211, a processor 213 and a transceiver 215. The storage module 211 stores a preamble sequence set and a mapping rule. The preamble sequence set includes a plurality of preamble sequences (e.g. in the LTE system, there are 64 preamble sequences) and these preamble sequences have optimal cross-correlation properties to each other, e.g. the Zadoff-Chu sequences. The mapping rule maps each of the preamble sequence to the at least one system block. For example, the mapping rule can be represented by the equation below:

$$RB_j = Preamble_i \bmod m,$$

where i is the preamble index, $Preamble_i$ represents the $i^{th}$ preamble sequence, j is the beginning resource block index, $RB_j$ represents the $j^{th}$ resource block, and m is the number of usable resource blocks on the UL-SCH. Moreover, the value of m is a preset value known by the wireless apparatus 21 and the base station 23. It shall be noted that the mapping rule is not merely limited to the above equation, and any function for mapping the preamble sequences to the resource block on the UL-SCH would belong to the scope of the present invention.

Figure 4:
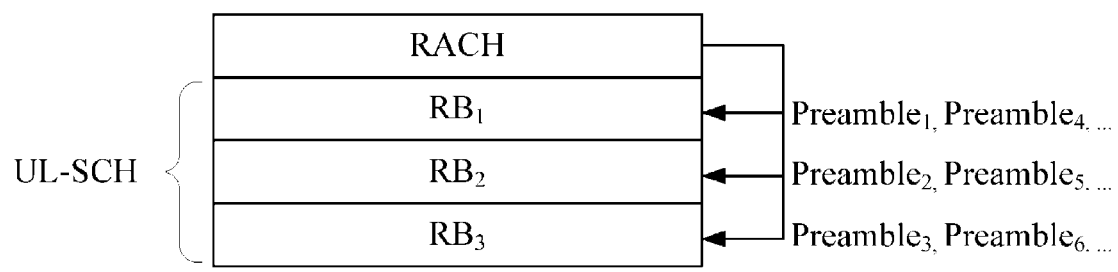
FIG. 4 is a schematic view illustrating the mapping rule for mapping the preamble sequence on the RACH to the resource block on the UL-SCH.

FIG. 4 is a schematic view illustrating the mapping rule for associating the preamble sequence on the RACH with the beginning resource block on the UL-SCH. As shown in FIG. 4, if the value of m is equal to 3, $Preamble_1$ is mapped to $RB_1$, $Preamble_2$ is mapped $RB_2$, and $Preamble_3$ is mapped to $RB_3$, $Preamble_4$ is mapped to $RB_1$, and so on. When the wireless apparatus 21 uses one resource block to carry the control message and selects $Preamble_{3k+r}$ (k is a positive integer and r is equal to 0, 1 or 2), the wireless apparatus 21 will carry the control message on $RB_{r+i}$.

On the other hand, when the wireless apparatus 21 uses two resource blocks to carry the control message, the wireless apparatus 21 will use $RB_{(r+1 \bmod m)}$ and $RB_{(r+2 \bmod m)}$ to carry the control message. Furthermore, when the wireless apparatus 21 uses three resource blocks to carry the control message, the wireless apparatus 21 will use $RB_{(r+1 \bmod m)}$, $RB_{(r+2 \bmod m)}$ and $RB_{(r+3 \bmod m)}$ to carry the control message. The operation for different values of m will be appreciated by those skilled in the art based on the above descriptions, and thus will not be further described herein.

Specifically, the processor 213, electrically connected to the storage module, randomly selects a preamble sequence from the preamble sequence set. After selecting the preamble sequence, the processor 213 selects at least one resource block on the UL-SCH corresponding to the preamble sequence according to the mapping rule. Alternately, the processor 213 can select the at least one resource block first, and then select the preamble sequence corresponding to the at least one resource block on the UL-SCH according to the mapping rule. Afterwards, the processor 213 enables the transceiver 215 to transmit the uplink signal 202 with the preamble sequence on the RACH and the control message on the selected at least one resource on the UL-SCH to the base station 23.

Figure 5:
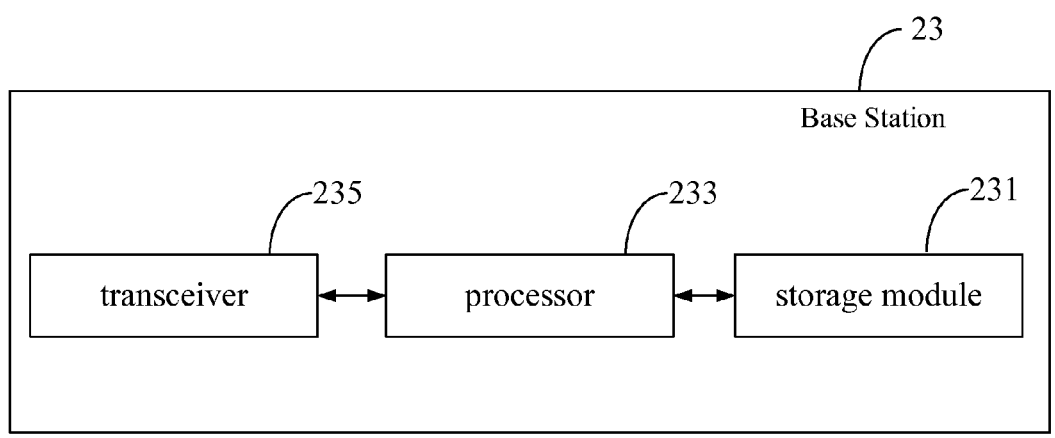
FIG. 5 is a schematic view of a base station of the present invention.

Furthermore, referring to FIG. 5, the base station 23 comprises a storage module 231, a processor 233 and a transceiver 235. The storage module 231 also stores the preamble sequence set and the mapping rule. The processor 233 is electrically connected to the storage module 231 and the transceiver 235. The processor 233 enables the transceiver 235 to receive the uplink signal 202 with the RACH and the UL-SCH from the wireless apparatus 21. After receiving the uplink signal 202, the processor 233 detects the preamble sequence from the RACH and retrieves the control message from the at least one resource block on the UL-SCH according to the mapping rule.

Since the storage module 231 stores the same preamble sequence set and the same mapping rule as the storage module 211, the base station 23 can detect the preamble sequence and then determine the at least one resource block on the UL-SCH corresponding to the preamble sequence according to the mapping rule. It should be appreciated that, in practical, the mapping rule can be pre-stored in both the wireless apparatus 21 and the base station 23, or pre-stored in the base station 23 and transmitted to the wireless apparatus 21 via a broadcast signal.

Figure 6A:
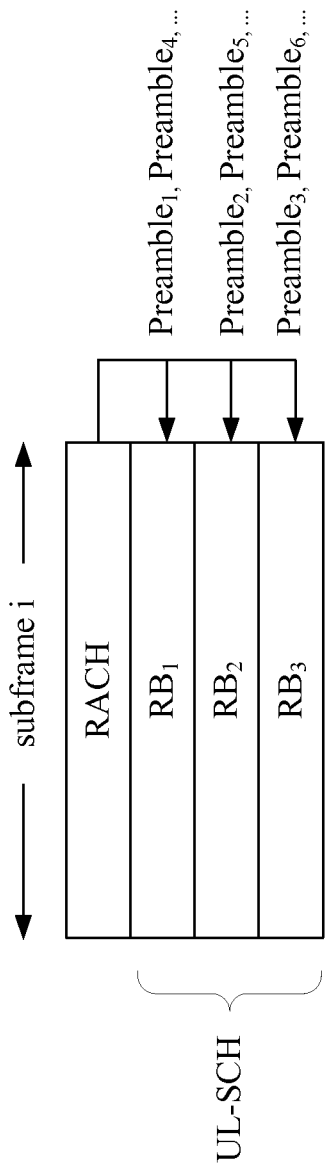
FIGS. 6A and 6B are schematic views illustrating the mapping rule for mapping the preamble sequence on the RACH to the resource block on the UL-SCH in the same subframe and the different subframes, respectively.
Figure 6B:
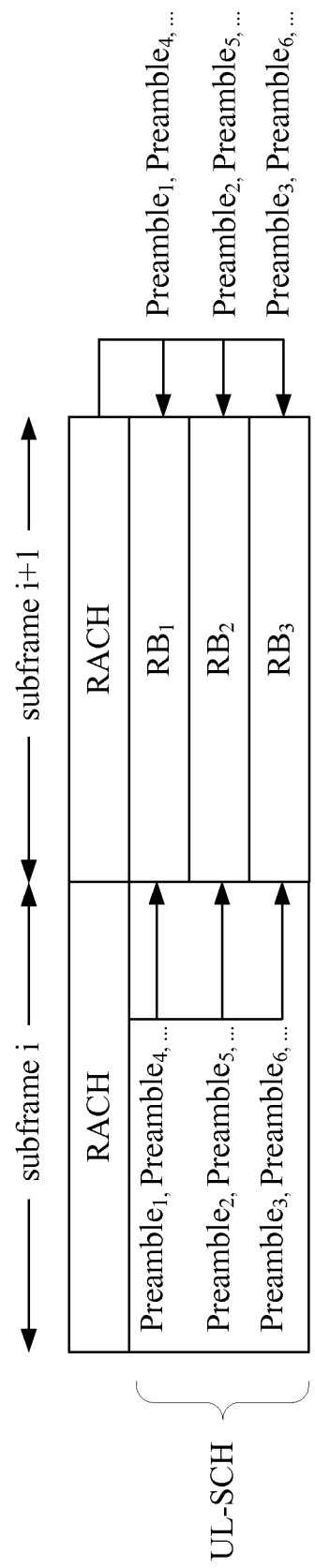

The second embodiment of this invention is depicted in FIGS. 6A and 6B. In practical, the signal (i.e. the uplink signal or the downlink signal) of the wireless network system can be presented by a frame structure. By this way, the uplink signal 202 is a frame comprising a plurality of subframes (e.g. 10 subframes). As shown in FIG. 6A, each subframe has an RACH and a UL-SCH. Each wireless apparatus can carry its preamble sequence on the RACH of a subframe (e.g. subframe i) and carry the control message on the at least one resource block on the UL-SCH of the same subframe (subframe i) according to the mapping rule.

As shown in FIG. 6B, each wireless apparatus may also carry its preamble sequence on the RACH of a subframe (e.g. subframe i) and carry the control message on the at least one resource block on the UL-SCH of another subframe (e.g. subframe i+1) according to the mapping rule. In other words, the mapping rule not only can be used to map the preamble on the RACH to the at least one resource block in the same subframe, but can also be used to map the preamble on the RACH to the at least one resource block in different subframes.

Figure 7A:
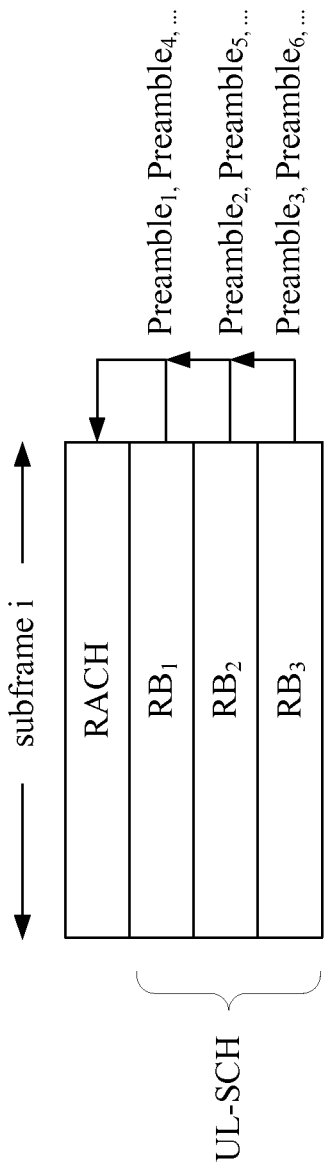
FIGS. 7A and 7B are schematic views illustrating the mapping rule for mapping the resource block on the UL-SCH to the preamble sequence on the RACH in the same subframe and the different subframes, respectively.
Figure 7B:
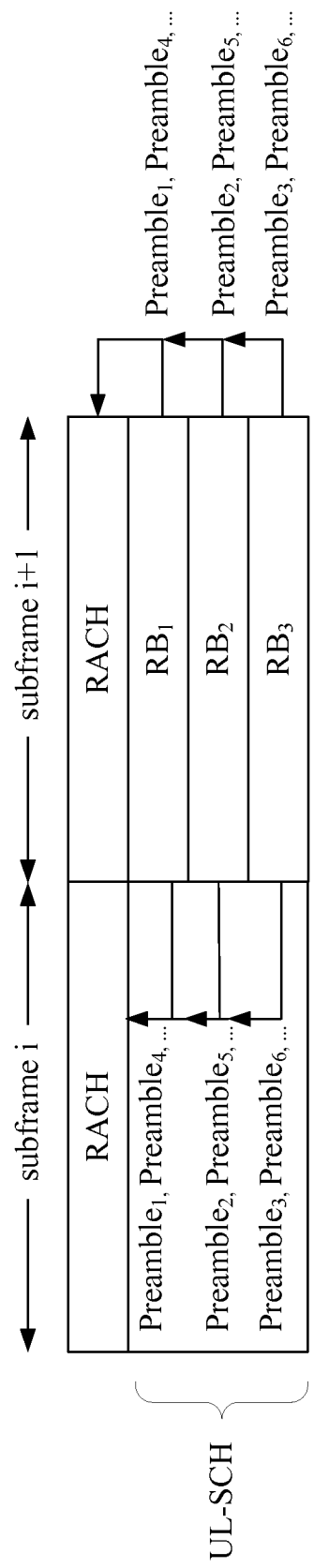

The third embodiment of this invention is depicted in FIGS. 7A and 7B. In the third embodiment, the wireless apparatus 21 randomly selects the at least one resource block first, and then selects the preamble sequence from the preamble set according to the selected at least one resource block and the mapping rule. As shown in FIG. 7A, each resource block can be the beginning resource block and associated with the preamble sequence in the same subframe.

For example, when the control message is on (1) $RB_1$, (2) $RB_1$ and $RB_2$, or (3) $RB_1$, $RB_2$ and $RB_3$, according to the mapping rule, the corresponding preamble sequence is $Preamble_{(3k+1)}$ (i.e. $Preamble_1$, Preamble 4, $Preamble_7$ or etc.). In other words, based on the beginning resource block used for the control message, the corresponding preamble sequence can be determined according to the mapping rule. Besides, as shown in FIG. 7B, each beginning resource block can also be associated with the preamble sequence in the different subframes.

It shall be noted that as long as the mapping rule stored in the wireless apparatus 21 and the based station 23 are the same, the base station 23 can detect the preamble sequence and retrieve the control message from the corresponding at least one resource block. The wireless apparatus 21 can also carry data on the at least one resource block and the base station 23 can retrieve the data from the at least one resource block. Therefore, the operation to retrieve the control messages and/or the data from the corresponding resource block in the same subframe or different subframes will be appreciated by those skilled in the art based on the above descriptions and thus will not be further described herein.

Figure 8:
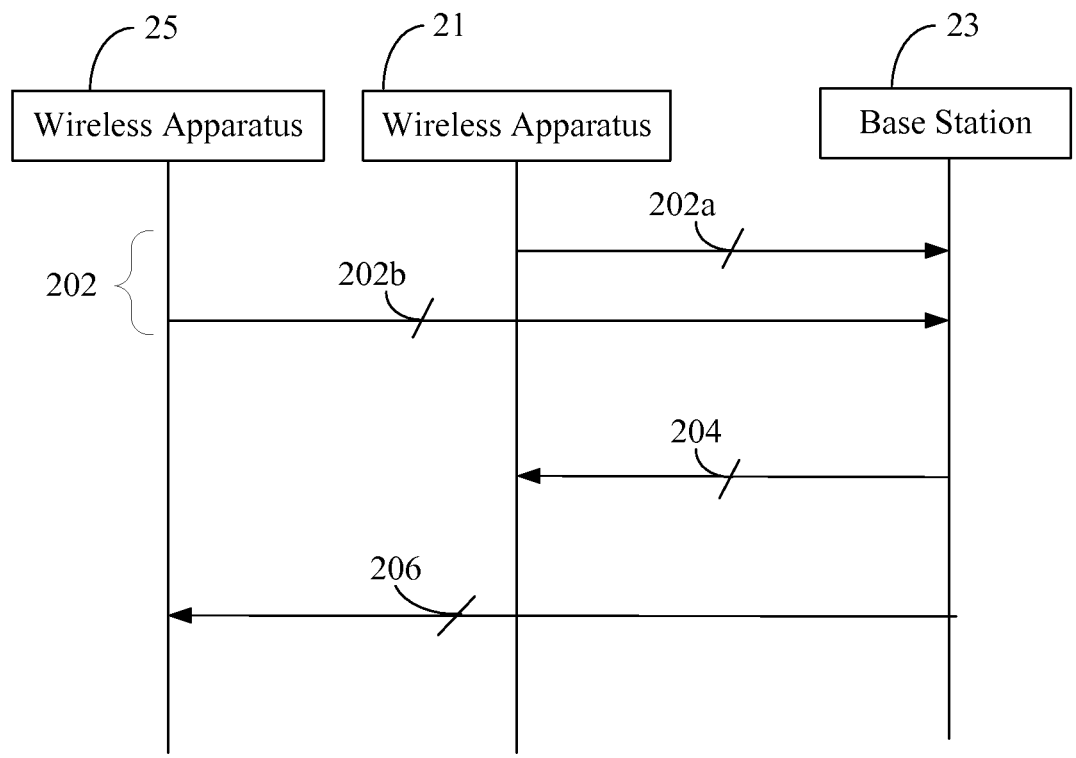
FIG. 8 is a schematic view illustrating the uplink random access procedure for a wireless network system of the present invention.

The fourth embodiment of this invention is depicted in FIG. 8, which illustrates the uplink random access procedure for the wireless network system of the present invention. The uplink signal 202 received by the base station 23 may be a composite signal constituted by the uplink signal 202a from the wireless apparatus 21 (the first wireless apparatus) and the uplink signal 202b from the wireless apparatus 25 (the second wireless apparatus).

As aforementioned, since the preamble sequences in the preamble sequence set have optimal cross-correlation properties to each other, the preamble sequence (hereinafter called the first preamble sequence) on the RACH of the uplink signal 202a and the preamble sequence (hereinafter called the second preamble sequence) on the RACH of the uplink signal 202b can be separately identified and used by the base station 23 even though the first preamble sequence and the second preamble sequences are overlapped in the same time and frequency resource.

After identifying the first preamble sequence and the second preamble sequence, the base station 23 retrieves a first control message from at least one first resource block corresponding to the first preamble sequence, and retrieves a second control message from at least one second resource block corresponding to the second preamble sequence. Afterwards, the base station 23 transmits a downlink signal 204 with a contention resolution message to the wireless apparatus 21 and a downlink signal 206 with a contention resolution message to the wireless apparatus 25, respectively.

If the base station 23 detects that the first preamble sequence and the second preamble sequence are mapped to the same resource block, the base station 23 will assign the different resource block for the wireless apparatus 21 and the wireless apparatus 25 via the downlink signal 204 and the downlink signal 206. In this case, the downlink signal 204 includes information of the assigned resource block and a negative-acknowledgement (NACK) message. Likewise, the downlink signal 206 includes information of the assigned resource block and a NACK message.

On the other hand, if there is no preamble sequence collisions, meaning the first preamble sequence and the second preamble sequence are not the same and are mapped to different resource blocks, both the downlink signal 204 and the downlink signal 206 will include a positive-acknowledgement (ACK) message.

In addition, the at least one first resource block and the at least one second resource block may also include data, and the base station 23 can also retrieve the data from the at least one first resource block and the at least one second resource block, respectively. It shall be noted that the uplink signal 202 received by the base station 23 may be constituted by more than two uplink signals from different wireless apparatus. The operation to retrieve the control messages and/or data from the different resource blocks corresponding to the different preamble sequences will be appreciated by those skilled in the art based on the above descriptions and thus will not be further described herein.

Figure 9:
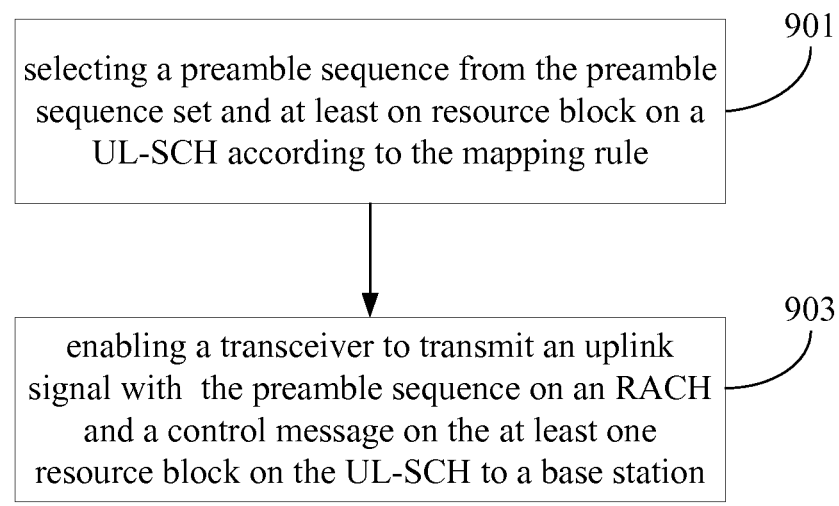
FIG. 9 is a flowchart of the uplink contention method for the wireless apparatus of the present invention.

A fifth embodiment of the present invention is an uplink contention method for a wireless apparatus, a flowchart of which is depicted in FIG. 9. The uplink contention method is adapted for the wireless apparatus 21 described in the previous embodiments. The uplink contention method can be implemented by a computer program product comprising a non-transitory computer readable medium storing a program for the uplink contention method. When the program is loaded into the wireless apparatus, the uplink contention method can be executed and accomplished by the processor of the wireless apparatus.

Firstly, step 901 is executed to select a preamble sequence from the preamble sequence set and at least one resource block on a UL-SCH according to the mapping rule. More specifically, in step 901, the preamble sequence can be randomly selected first, and the at least one resource block on the UL-SCH corresponding to the preamble sequence can be selected according to the mapping rule. Alternately, in step 901, the at least one resource block on the UL-SCH can be randomly selected first, and the preamble sequence corresponding to the at least one resource block on the UL-SCH can be selected according to the mapping rule.

Afterwards, step 903 is executed to enabling a transceiver to transmit an uplink signal with the preamble sequence on an RACH and a control message on the at least one resource block on the UL-SCH to a base station. In step 903, the preamble sequence can be on the RACH of a subframe and the control message can be on the at least one resource block on the UL-SCH of the same subframe. In addition, the control message may be on the at least one resource block on the UL-SCH of another subframe based on the mapping rule. Besides, in step 903, the uplink signal may further include data on the at least one resource block on the UL-SCH.

Figure 10:
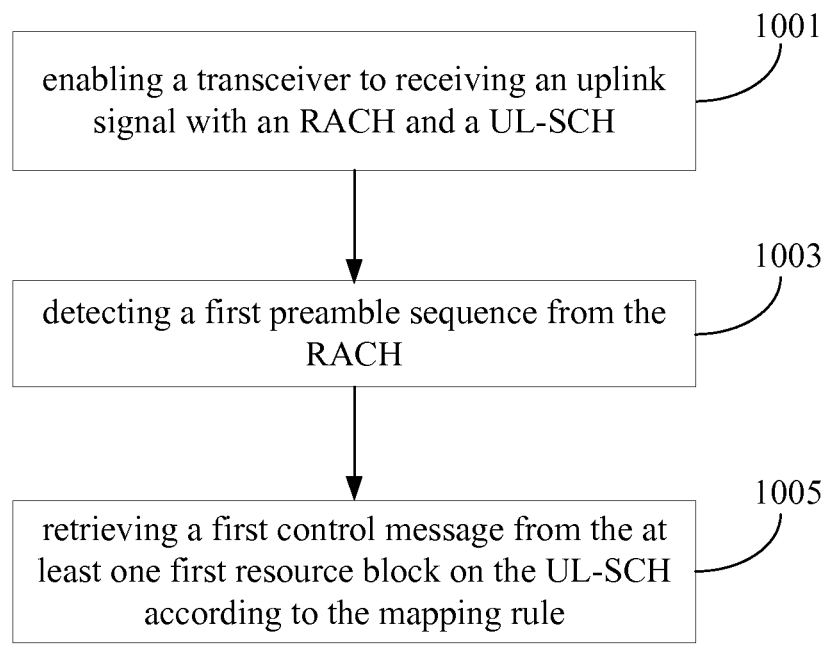
FIG. 10 is a flowchart of the uplink contention method for the base station apparatus of the present invention.

A sixth embodiment of the present invention is an uplink contention method for a base station, a flowchart of which is depicted in FIG. 10. The uplink contention method is adapted for the base station 23 described in the previous embodiments. The uplink contention method can implemented by a computer program product comprising a non-transitory computer readable medium storing a program for the uplink contention method. When the program is loaded into the base station, the uplink contention method can be executed and accomplished by the processor of the base station.

Firstly, step 1001 is executed to enabling a transceiver to receiving an uplink signal with an RACH and a UL-SCH. Step 1003 is then executed to detect a first preamble sequence from the RACH. Afterwards, step 1005 is executed to retrieve a first control message from the at least one first resource block on the UL-SCH according to the mapping rule. The first preamble sequence is included in the preamble sequence set, and the mapping rule maps the first preamble sequence to the at least one first resource block. Besides, step 1005 may further comprise the step of retrieving data from the at least one first resource block on the UL-SCH.

Moreover, step 1005 further comprises the step of determining the at least one first resource block corresponding to the first preamble sequence according to the mapping rule before retrieving the first control message from the at least one first resource block on the UL-SCH. Step 1003 may be executed to detect the first preamble sequence from the RACH of a subframe and step 1005 may be executed to retrieve the first control message from the at least one first resource block on the UL-SCH of the same subframe. In addition, step 1003 may be executed to detect the first preamble sequence from the RACH of a subframe and step 1005 may be executed to retrieve the first control message from the at least one first resource block on the UL-SCH of another subframe.

The uplink signal may be a composite signal constituted by the uplink signals from the multiple wireless apparatus. For example, the uplink signal includes a first uplink signal transmitted from a first wireless apparatus and a second uplink signal transmitted from a second wireless apparatus. In this case, step 1003 further comprises the step of detecting a second preamble sequence from the RACH and step 1005 further comprises the step of retrieving a second control message from the at least one second resource block on the UL-SCH according to the mapping rule. The mapping rule maps the second preamble sequence to the at least one second resource block.

In more detail, the first preamble sequence and the at least one first resource block relate to a first wireless apparatus, and the second preamble sequence and the at least one second resource block relate to the second wireless apparatus. Similarly, step 1003 may be executed to detect the first preamble sequence and the second preamble sequence from the RACH of a subframe, and step 1005 may be executed to retrieve the first control message from the at least one first resource block and the second control message from the at least one second resource block on the UL-SCH of the same subframe.

In addition, step 1003 may be executed to detect the first preamble sequence and the second preamble sequence on the RACH of a subframe, and step 1005 may be executed to retrieve the first control message from the at least one first resource block and the second control message from the at least one second resource block on the UL-SCH of another subframe.

According to the above descriptions, the present invention uses a mapping rule to map each preamble to at least one resource block and omits the step of transmitting a downlink signal with a random access response message from the base station to the wireless apparatus from the uplink random access procedure. By this way, the wireless apparatus can only transmit an uplink signal with a preamble sequence on the RACH and a control message on the at least one resource block on the UL-SCH during the uplink random access procedure.

In addition, the base station can retrieve the control message from the at least one resource block on the UL-SCH of the same uplink signal according to the mapping rule. By using the uplink random access procedure of the present invention, especially when the wireless apparatus only wants to request more resources from the base station, the efficiency of the wireless network system can be improved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless apparatus comprising:
   a storage module, being configured to store a preamble sequence set and a mapping rule;
   a processor, being configured to select a preamble sequence from the preamble sequence set and at least one resource block on an uplink shared channel (UL-SCH) according to the mapping rule;
   a transceiver, being configured to transmit an uplink signal comprising the preamble sequence on a random access channel (RACH) and comprising a control message on the at least one resource block on the UL-SCH to a base station;
   wherein the mapping rule maps the preamble sequence to the at least one resource block on the UL-SCH such that the base station retrieves the control message on the at least one resource block on the UL-SCH.

2. The wireless apparatus as claimed in claim 1, wherein the processor selects the at least one resource block on the UL-SCH corresponding to the preamble sequence according to the mapping rule.

3. The wireless apparatus as claimed in claim 1, wherein the processor selects the preamble sequence corresponding to the at least one resource block on the UL-SCH according to the mapping rule.

4. The wireless apparatus as claimed in claim 1, wherein the preamble sequence is on the RACH of a subframe and the at least one resource block is on the UL-SCH of the subframe.

5. The wireless apparatus as claimed in claim 1, wherein the preamble sequence is on the RACH of a subframe and the at least one resource block is on the UL-SCH of another subframe.

6. The wireless apparatus as claimed in claim 1, wherein the uplink signal further includes data on the at least one resource block on the UL-SCH.

7. The wireless apparatus as claimed in claim 1, wherein the wireless apparatus conforms to a Long-Term Evolution (LTE) standard, the UL-SCH is a physical uplink shared channel, the RACH is a physical random access channel, and the preamble sequence is a Zadoff-Chu sequence.

8. An uplink contention method for a wireless apparatus, the uplink contention method comprising the steps of:
   selecting a preamble sequence from a preamble sequence set and at least one resource block on an uplink shared channel (UL-SCH) according to a mapping rule; and
   transmitting, by a transceiver, to transmit an uplink signal comprising the preamble sequence on a random access channel (RACH) and comprising a control message on the at least one resource block on the UL-SCH to a base station;
   wherein the mapping rule maps the preamble sequence to the at least one resource block on the UL-SCH such that the base station retrieves the control message on the at least one resource block on the UL-SCH.

9. The uplink contention method as claimed in claim 8, further comprising the step of selecting the at least one resource block on the UL-SCH corresponding to the preamble sequence according to the mapping rule.

10. The uplink contention method as claimed in claim 8, further comprising the step of selecting the preamble sequence corresponding to the at least one resource block on the UL-SCH according to the mapping rule.

11. The uplink contention method as claimed in claim 8, wherein the preamble sequence is on the RACH of a subframe and the control message is on the at least one resource block on the UL-SCH of the subframe.

12. The uplink contention method as claimed in claim 8, wherein the preamble sequence is on the RACH of a subframe and the control message is on the at least one resource block on the UL-SCH of another subframe.

13. The uplink contention method as claimed in claim 8, wherein the uplink signal further includes data on the at least one resource block on the UL-SCH.

14. The uplink contention method as claimed in claim 8, wherein the wireless apparatus conforms to a Long-Term Evolution (LTE) standard, the UL-SCH is a physical uplink shared channel, the RACH is a physical random access channel, and the preamble sequence is a Zadoff-Chu sequence.

* * * * *